United States Patent [19]

Shao-Yung

[11] Patent Number: 5,021,912
[45] Date of Patent: Jun. 4, 1991

[54] APPARATUS FOR CLEANING THE RECORDING/PLAYING HEAD, CAPSTAN AND PINCH ROLLER OF A CASSETTE TYPE AUDIO RECORDER/PLAYER

[76] Inventor: Lu Shao-Yung, 4th Floor, No. 542-2, Chung-Cheng Road, Hsin-Dein City, Taipei Hsien, Taiwan

[21] Appl. No.: 350,120

[22] Filed: May 10, 1989

[51] Int. Cl.⁵ .................................................. G11B 5/41
[52] U.S. Cl. ...................................................... 360/128
[58] Field of Search ....................... 360/132, 137, 128; 15/210 R

[56] References Cited

U.S. PATENT DOCUMENTS 4,713,712 12/1987 Chou ..................................... 360/128
4,716,485 12/1987 Yeung ................................... 360/128
4,825,319 4/1989 Andreas ................................ 360/128

Primary Examiner—David J. Severin
Attorney, Agent, or Firm—Kirschstein, Ottinger, Israel & Schiffmiller

[57] ABSTRACT

Apparatus for cleaning the recording/playing head, capstan and pinch roller of cassette-type audio recording/playing machine comprises a cassette-type housing; a first cleaner rotatably and slidably mounted in the housing; a drive for simultaneously rotating and sliding the first cleaner to clean the peripheral surface of the recording/playing head and at least a second cleaner pivotably mounted in the housing for simultaneously contacting and cleaning the capstan and pinch roller of the audio recording/playing machine.

9 Claims, 7 Drawing Sheets

APPARATUS FOR CLEANING THE RECORDING/PLAYING HEAD, CAPSTAN AND PINCH ROLLER OF A CASSETTE TYPE AUDIO RECORDER/PLAYER

FIELD OF THE INVENTION

The present invention relates to an apparatus for cleaning the recording/playing head, capstan(s) and pinch roller(s) of a cassette type audio recorder/player.

BACKGROUND OF THE INVENTION

In a cassette type recording/playing machine typically there are a recording/playing head, one or two capstan(s) and one or two pinch roller(s). For proper operation of the recording/playing machine, it is turned off so that the surface portions of these components can be cleaned periodically.

The prior art shows various cassette-like devices for cleaning the recording/playing head, the capstan and pinch roller of a cassette type recording/playing machine. One known cleaning device has a cleaning element to engage the peripheral surface of the recording/playing head and can only reciprocally clean along its peripheral surface, but not rotatably clean. Thus, the peripheral surface of the head cannot be effectively cleaned.

Other known cleaning devices have a cleaning element fixedly mounted inside each window of the cassette type housing. When both the capstan and pinch roller are inserted into each window, said cleaning element is intended to contact both components simultaneously. In fact, this object cannot be achieved since if one of the components contacts one portion of the cleaning element, the other portions are always depressed away from the other components so that they cannot contact such other components. Even if both components can contact the cleaning element simultaneously, the pressures applied on those components by the cleaning element are different. Thus, one of the components cannot always be effectively cleaned.

For solving this problem, the prior art teaches two separate cleaning elements respectively mounted on two separate elastic members. However, one of the cleaning elements blocks the capstan hole so that the capstan cannot easily be inserted into the capstan hole of the cassette type housing.

OBJECT OF THE INVENTION

In view of this, it is an object of the present invention to provide an apparatus which can effectively and reliably clean those operating components of a cassette type recording/playing machine.

SUMMARY OF THE INVENTION

The invention is a cleaning apparatus particularly adapted for use with a cassette type audio recording/playing machine. The audio recording/playing machine has two spindles, a capstan, a pinch roller and a magnetic head which has a peripheral surface that is subject to contamination. The capstan and pinch roller have cylindrical surfaces that are subject to contamination too. The cleaning apparatus of the present invention is adapted to clean the peripheral surface and the cylindrical surfaces. The apparatus comprises a housing adapted to be mounted in an operating position relative to the machine. The housing has a front portion, a rear portion, a first and a second side portion, a top wall and a bottom wall. The housing further has a straight guiding means parallel to a front peripheral edge of the front side portion, first and second windows to receive the head and the pinch roller, and two holes to receive two spindles respectively.

A sliding member is reciprocatingly and slidably mounted in a first straight guiding means. The sliding member has a second straight guiding means normal to the first straight guiding means. A first cleaning means is rotatably mounted on the sliding member and rotates about an axis which is normal to the front peripheral edge of the housing.

A first gear is connected to the first cleaning means. A second gear is rotatably mounted in the sliding member. The second gear is in mesh with the first gear in a vertical relationship. The rotating member has a driver and an eccentric, both being eccentrically formed about the axis. The eccentric is operatively engaged with the second straight guiding means, and the driver is operatively engaged with a follower of the second gear.

Two driving means are rotatably mounted around the two holes of the housing respectively and are operatively connected to the rotating member in order to rotate the rotating member.

There are two cleaning means pivotably mounted inside two windows respectively. Each cleaning means has a flip-flop member and two cleaning elements. The cleaning elements are respectively mounted at ends of the flip-flop members. Thus, each cleaning element should contact and apply a suitable force against the capstan and pinch roller. Therefore, those components could be effectively cleaned.

The cleaning elements associated with the sliding member continuously rotate about the axis and reciprocatingly move along the peripheral surface of the head in order to rotationally and reciprocatingly clean the peripheral surface of the head. Thus, the contaminated peripheral surface of the head is effectively cleaned.

Other features of the present invention will become apparent from the following detailed description.

DETAILED DESCRIPTION OF THE PREFERRED EMBODIMENTS

The embodiments of the present invention are particularly adapted to clean the audio recording/playing head, capstan and pinch roller of an audio recording/playing unit which is adapted to accept cassette-type playing tapes.

Figure 1:
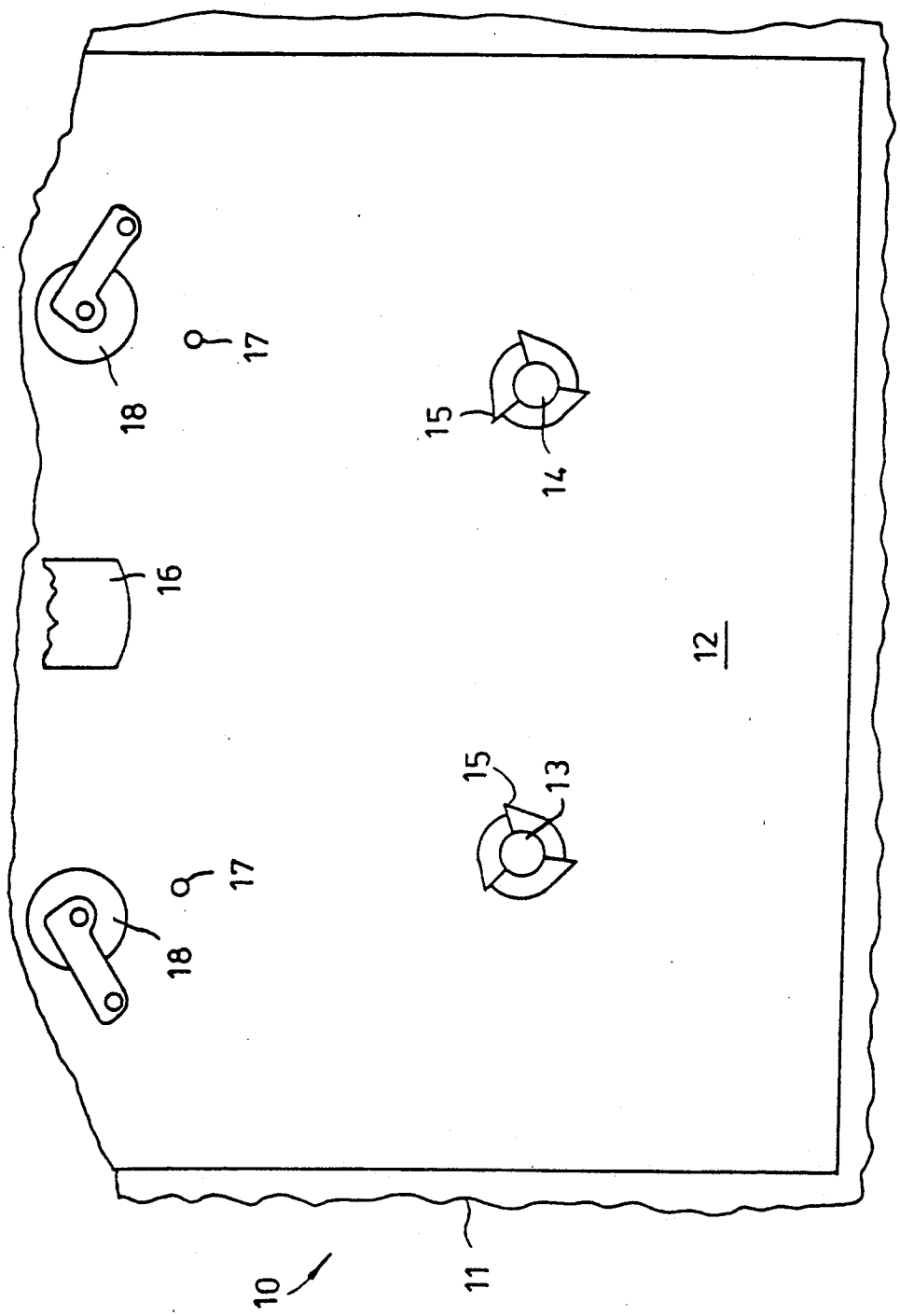
FIG. 1 is a semi-schematic plan view looking down on the main operating components for an audio recorder/player according to the prior art for which the present invention is particularly adapted.

With reference to FIG. 1, the terms "front" and "rear" will denote proximity to those portions of the audio recording/playing unit 10 shown at, respectively, the upper and lower parts of FIG. 1. In like manner, the terms "left" and "right" will denote proximity to the portions of the unit 10 shown at the left and right parts of the drawing of FIG. 1.

The unit 10 has a main housing 11 which provides a recess 12 to receive an audio tape cassette (not shown). A first left spindle 13 and a second right spindle 14 are located within the recess 12. Each of the spindles 13 and 14 have a plurality of sprocket teeth 15 to engage a related spool of an audio tape cassette.

Located forwardly of the recess 12 is an operating area where there is a recording/playing head 16, a capstan 17 and a pinch roller 18. Some audio recording/playing units having an auto reverse function have two capstans and pinch rollers mounted at opposite sides of the head 16, respectively. When a play key of the unit 10 is depressed, the pinch roller or either of the pinch rollers is moved from a first nonoperative position to a second operative position, and a suitable force is applied against the capstan and the tape.

As indicated earlier, all of the components described thus far with reference to FIG. 1 already exist in the prior art. The present invention performs an effective cleaning operation on certain operating components of the unit 10, and this will be described with reference to FIGS. 2 through 9.

Figure 2:
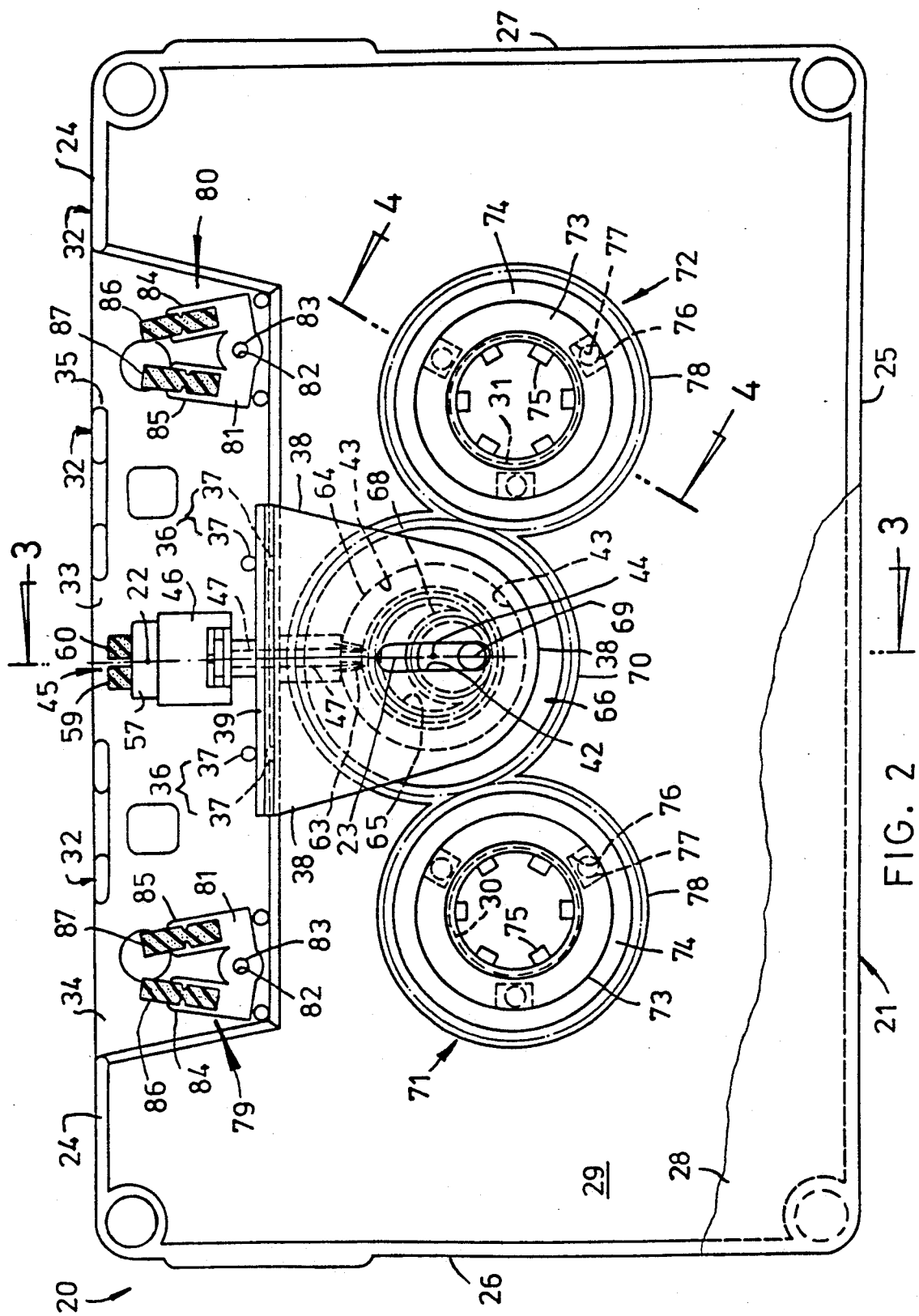
FIG. 2 is a plan view of the cleaning apparatus of the present invention.
Figure 3:
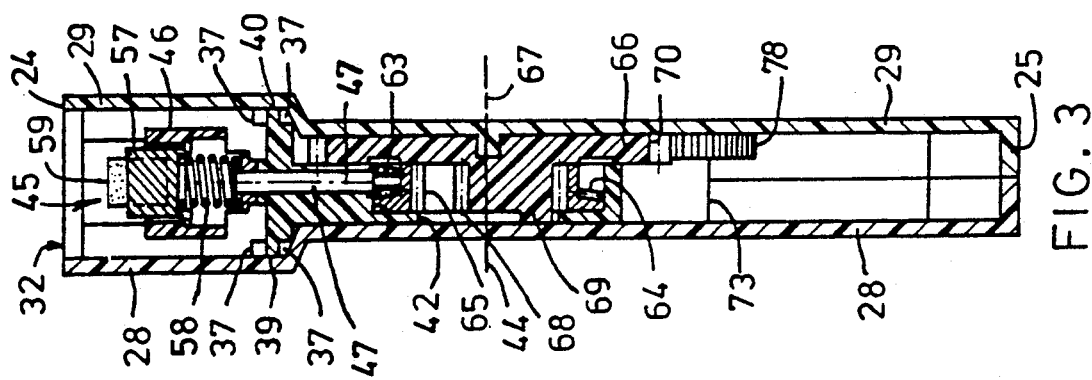
FIG. 3 is a cross-sectional view taken along line 3—3 of FIG. 2.
Figure 4:
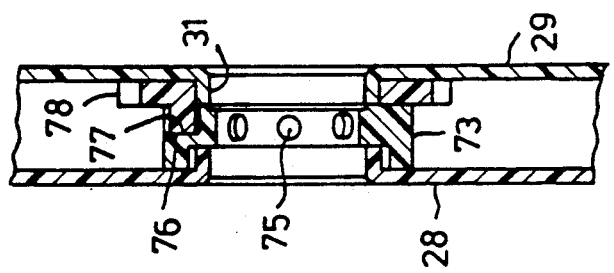
FIG. 4 is a cross-sectional view taken along line 4—4 of FIG. 2, showing details of the driving means.

The apparatus of the present invention is a cassette-type cleaner, indicated at 20, and shown in FIG. 2. It can be seen that the apparatus comprises a housing 21, having the same overall configuration as the housing of a prior art tape cassette. Thus, the housing 21 can readily be inserted into the recess 12 of the unit 10.

The housing 21 is made of two covers, each having the same overall configuration as the other. For clearly showing all of the components of the apparatus, one cover of the main cassette housing is shown in a broken-away view.

The housing 21 has a front portion 24, a rear portion 25, left and right side portions 26, 27, top and bottom walls 28, 29, and two holes 30, 31. The front portion 24 further has a front peripheral edge 32, at least a first window 33 and two second windows 34, 35 formed therein. The first window 33 receives the head 16, and each of the second windows 34, 35 receives a respective pinch roller 18. (please refer to FIG. 9).

A first straight guiding means 36 is formed in the housing 21 and extends parallel to the front peripheral edge 32. The first straight guiding means 36 is made of eight guiding cylinders 37, four of the eight guiding cylinders being formed under the top wall 28 and the others being formed on the bottom wall 29.

A sliding member 38 has two straight edges 39, 40 that reciprocate between and are slidably mounted between two pairs of the guiding cylinders 37. A second straight guiding means is formed as a straight groove 42 and extends normal to the first guiding means 36. A circular pit 43 has a central point 44 that is positioned on the central line 23 of the straight groove 42.

A first cleaning means 45 is rotatably mounted on the sliding member 38 and rotates about an axis 22 which is vertical to the front peripheral edge 32 of the housing 21.

The first cleaning means 45 comprises a support member 46, floating member 57, elastic member 58 and two cleaning elements 59, 60. The support member 46 is connected to the upper end of a shaft 47.

The support member 46 has a circular pit which has an internal wall 48. The internal wall 48 of the circular pit has two first axial direction grooves 51, 52, each connected to a side edge 50 of the support member 46; two second axial direction grooves 53, 54, each unconnected to the same side edge 50; and two circular openings 55, 56, the opening 55 connecting the groove 51 with the groove 53, and the opening 56 connecting the groove 52 with the groove 54.

The floating member 57 has two engaging portions 61, 62 symmetrically formed on the outside wall of the floating member 57 and respectively inserted in the second axial direction grooves 53, 54 through the grooves 51, 52 and the openings 55, 56. The elastic member 58 is mounted between the support member 46 and the floating member 57 and urges the floating member 57 in order to cause the two engaging portions 61, 62 to contact and stop against the second axial direction grooves 53, 54. The cleaning elements 59, 60 extend in mutual parallelism and are removably mounted on the floating member 57.

A first gear 63 is connected to the lower end of the shaft 47. A second gear 64 is rotatably mounted in the circular pit 43 of the sliding member 38 and rotates about the central axis 44. The second gear is in mesh with the first gear in a vertical relationship.

The second gear 64 has a follower 65 formed as an internal gear which is concentrically formed in the second gear 64. A rotating member 66 is rotatably mounted in the housing 21 about an axis 67 which is positioned separately equidistant from the left and right side portions 26, 27 of the housing 21. The rotating member 66 further has a driver 68 and an eccentric 69, both eccentrically formed about the axis 67 respectively. The eccentric 69 operatively engages the straight groove 42 of the sliding member 38. The driver 68 is formed as a gear that meshes with the internal gear 65 of the second gear 64. The rotating member 66 still further has a third gear 70 that separately meshes with two fourth gears 78, 78 respectively of two driving means 71, 72 to be described hereinafter.

There are two driving means 71, 72 rotatably mounted around the two holes 30, 31 of the housing 21 respectively. Each of the driving means 71, 72 comprises a first and a second driving member 73, 74. The first driving member 73 has a hollow first engaging portion 75 and a second engaging portion 76. The first engaging portion 75 engages the sprocket teeth 15 of the spindle 13 or 14 of the unit 10. The second driving member 74 has a third engaging portion 77 operatively engaging the second engaging portion 76. The second driving member 72 further has a fourth gear 78 which is in mesh with the third gear 70 of the rotating member 66.

There are two second cleaning means 79, 80 pivotably mounted inside the two second windows 34, 35 of the housing 21 respectively. Each cleaning means 79, 80 comprises a flip-flop member 81 and two cleaning elements 86, 87. Each flip-flop member 81 is rotatably mounted inside a respective second window by a hole 82 that pivotably engages a shaft 83, and has two elastic clamps 84, 85 respectively formed at its two ends. The cleaning elements are removably inserted in those clamps 84, 85, respectively.

Figure 6:
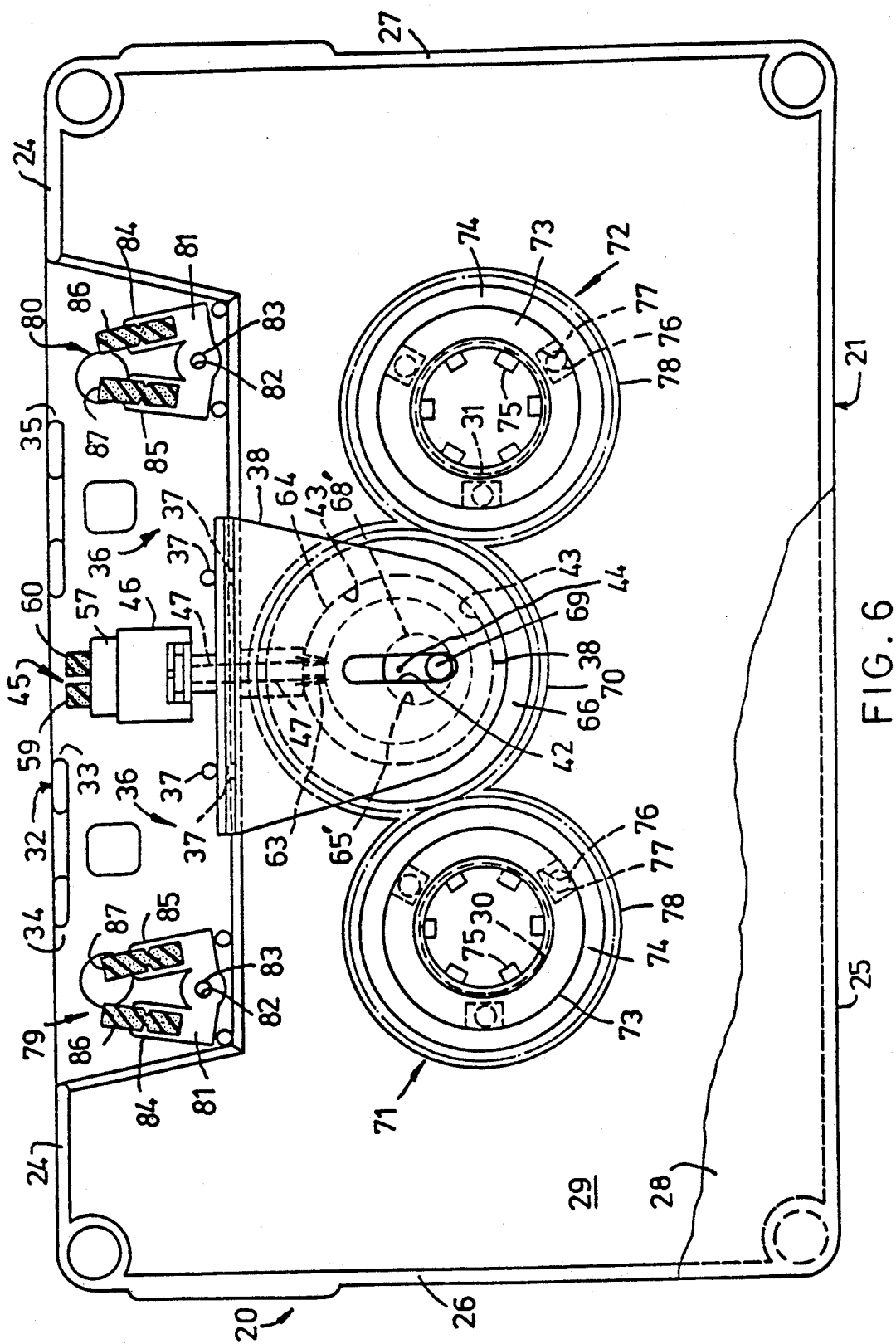
FIG. 6 is a plan view of the cleaning apparatus, showing another embodiment of the driver and follower of the present invention.
Figure 8:
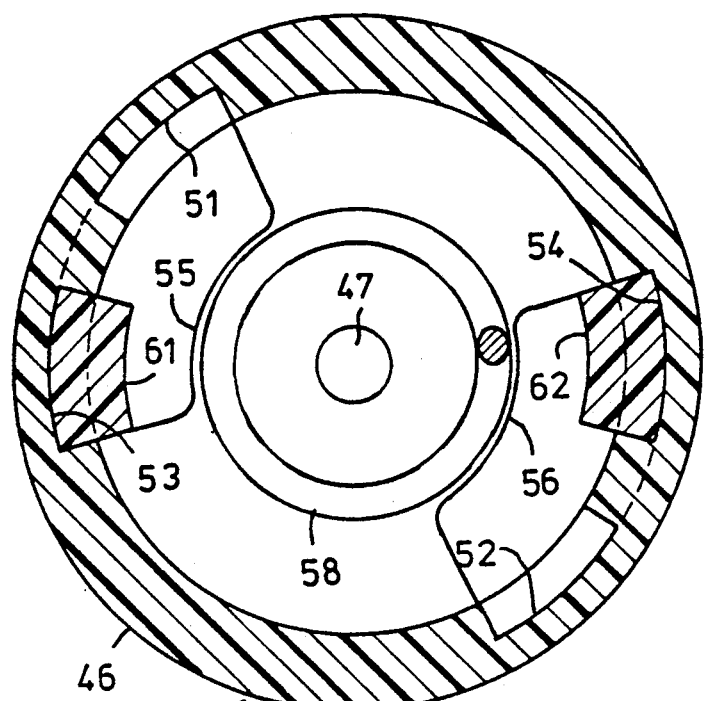
FIG. 8 is a cross-sectional view taken along line 8—8 of FIG. 7.
Figure 7:
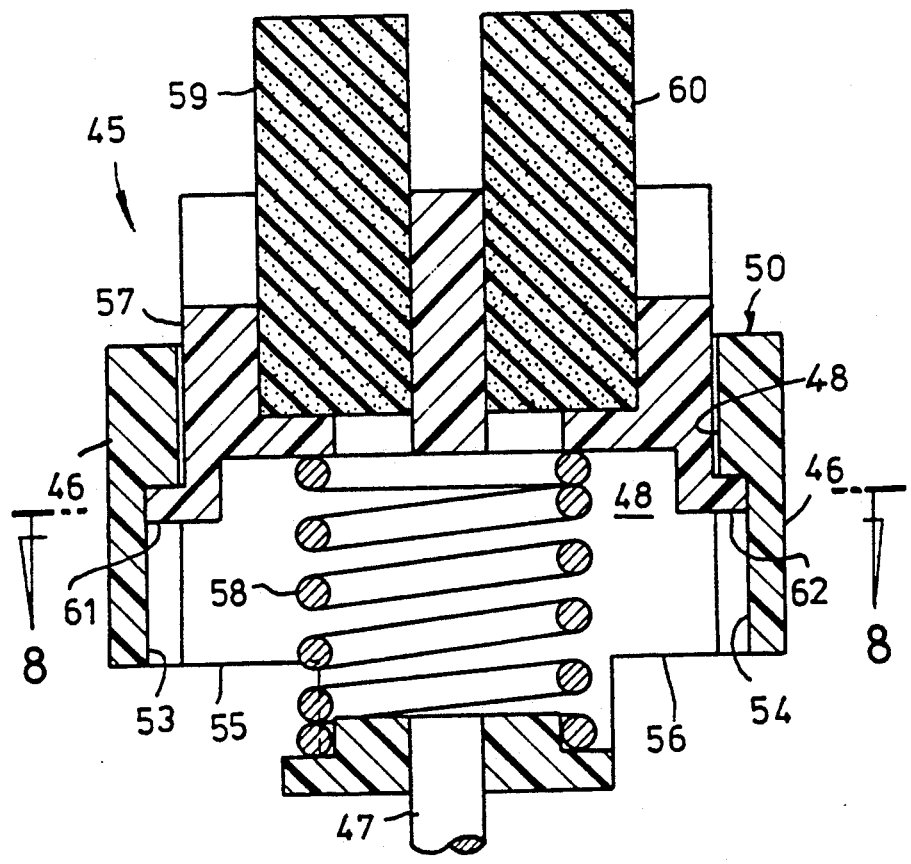
FIG. 7 is an enlarged sectional view of the first cleaning means of the present invention.
Figure 9:
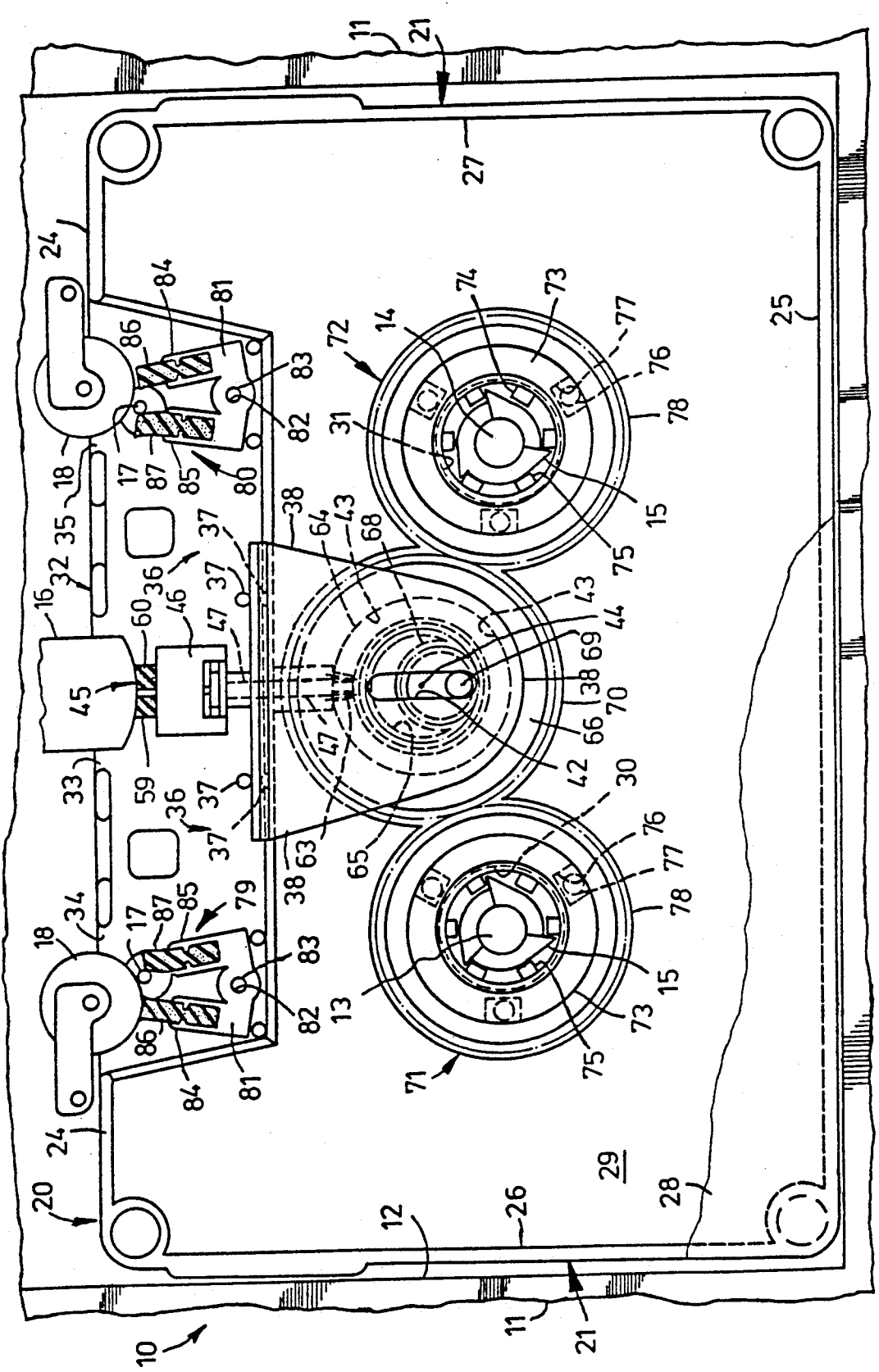
FIG. 9 is a plan view of the cleaning apparatus of the present invention, showing the cleaning apparatus during operation.

Please refer to FIG. 6. The follower 65 of the second gear 64 may be formed as an eccentric circular hole 65' (or an eccentric), and the driver 68 of the rotating member 66 may be formed as an eccentric 68'0 (or an eccentric circular hole). The second gear 64 is eccentrically mounted on the rotating member 66 by means of the eccentric 68' or the eccentric circular hole rotatably engaging the circular hole 65' or the eccentric.

The eccentric distance between the central axis of the eccentric 69 of the rotating member 66 and the axis 67 of the rotating member 66 is twice that of the eccentric distance between the central axis of the driver 68 of the rotating member 66 and the axis 67 of the rotating member 66. Thus, the internal gear 65 is in perfect mesh with the gear 68.

In use, the cleaning apparatus 20 of the present invention is positioned in the recess 12 of the unit 10. With regard to how the cleaning apparatus 20 cleans all the components of the unit 10, that operation will be described hereinafter.

Since each flip-flop member 81 can freely pivot in the housing 21, each cleaning element 87 should easily move away from the capstan 17, if the capstan 17 touched the element 87, thereby allowing the cleaning apparatus 20 to be easily inserted in the recess 12 of the unit 10, and the engaging portions 75, 76 to be operatively engaged with the spindles 13, 14 respectively.

When the user depresses the playing key of the audio recording/playing machine, each pinch roller 18 will move from a first nonoperative position to a second operative position, and apply a suitable force against each cleaning element 86, thereby urging the other cleaning element 87 into contact with the capstan 17 accordingly. Therefore, both the capstan 17 and the pinch roller 18 are effectively cleaned.

In the meantime, the head 16 of the unit 10 also moves from the first nonoperative position to the operative position. Thus, the peripheral surface of the head 16 engages the cleaning elements 59, 60. In the meantime, one of the spindles 13 or 14 rotates one of the driving means 71 or 72 and further rotates the rotating member 66. The rotating member 66 also rotates the other driving means 71 or 72 and the other spindle 13 or 14. Both the eccentric 69 and the driver 68 are eccentrically rotated about the axis 67 of the rotating member 66. The eccentric 69 reciprocatingly drives the sliding member 38, and the driver 68 rotates the second gear 64, the first gear 63, the support member 46, the floating member 56 and the cleaning elements in turn.

The cleaning elements 59, 60 continuously rotate about the shaft 47 and reciprocatingly move along the peripheral surface of the head 16 in order to rotationally and reciprocatingly clean the peripheral surface of the head 16. Thus, the contaminated peripheral surface of the head 16 is effectively cleaned.

Figure 5:
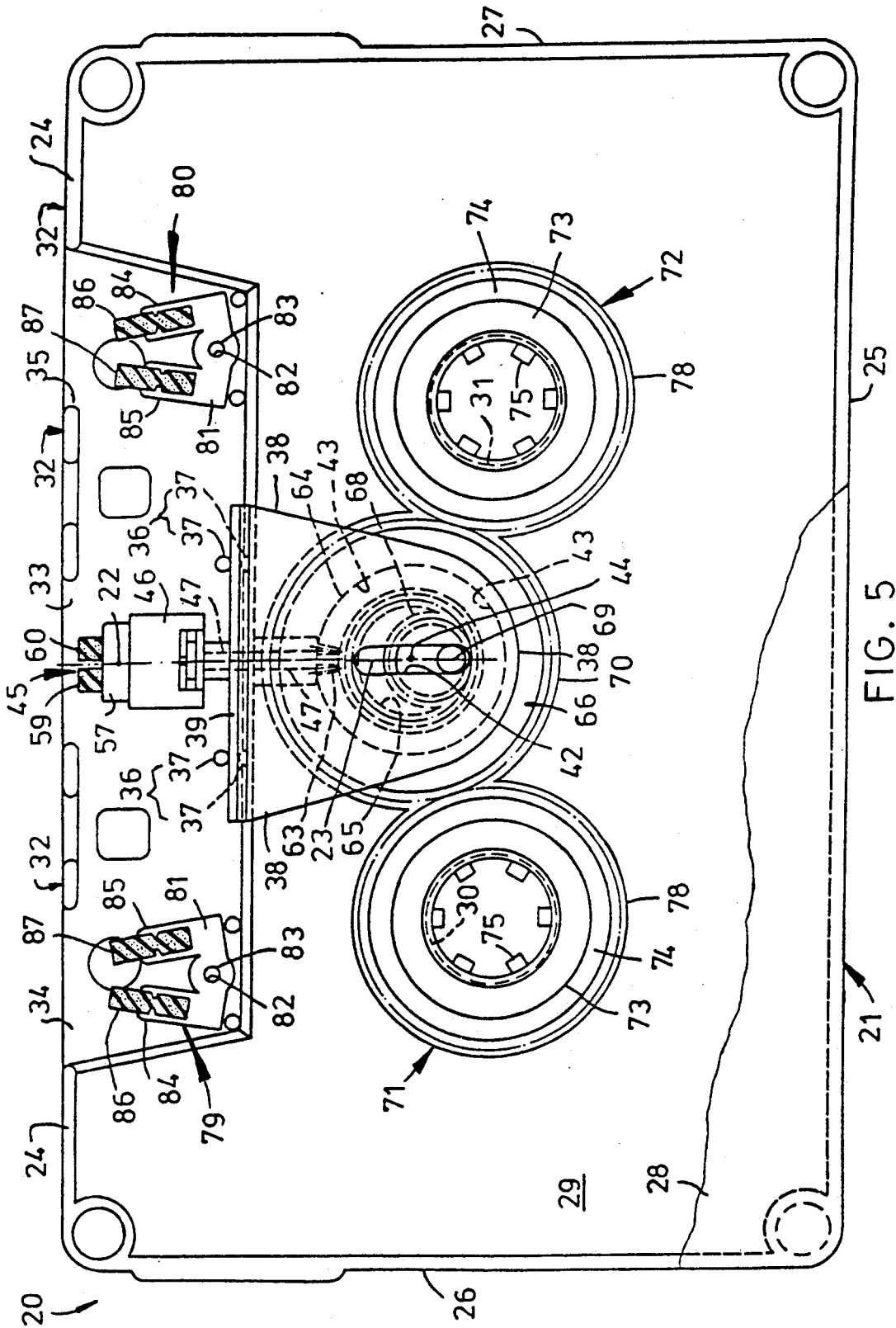
FIG. 5 is a plan view of the cleaning apparatus, showing another embodiment of two driving means of the present invention.

Please refer to FIG. 5; the first driving member 73 and the second driving member 74 may be integrally formed as one piece.

I claim:

1. In a tape recorder/player of the type including
   (A) a compartment for receiving a cassette in which a magnetic tape is received,
   (B) a pair of rotary spaced spindles to drive the tape during a play mode of operation,
   (C) a magnetic head having a peripheral surface against which the tape is driven,
   (D) at least one capstan having a peripheral surface against which the tape is driven and rotating during the play mode, and
   (E) at least one rotatable pinch roller having a peripheral surface against which the tape is driven and movable toward said at least one capstan to form a nip therewith for the tape during the play mode,
   an apparatus for cleaning said peripheral surfaces, comprising:
   (a) a cassette housing configured to fit, and receivable, within the compartment in a cleaning position, said housing including a generally planar front wall having a head opening through which the head extends into the housing in the cleaning position, a pinch roller opening through which said at least one pinch roller moves into the housing in the cleaning position, said housing further including a capstan opening through which said at least one capstan extends into the housing in the cleaning position;
   (b) a head cleaner mounted in the housing for rotation about a first axis extending generally normal to the front wall, and for reciprocating movement in either direction along a second axis extending generally parallel to the front wall, said head cleaner engaging the head in the cleaning position;
   (c) a capstan/roller cleaner mounted in the housing for pivoting movement about a third axis normal to both said first and said second axes, said capstan/roller cleaner including a pair of cleaning elements respectively engaging said at least one capstan and pinch roller to clean the peripheral surfaces thereof during rotation of said at least one capstan and pinch roller during the play mode; and
   (d) drive means operatively coupled to at least one of the spindles and the head cleaner, for simultaneously rotating the head cleaner about said first axis and reciprocating the head cleaner in either direction along said second axis, to clean the peripheral surface of the head.

2. The apparatus according to claim 1, wherein the housing has two pinch roller openings in the front wall, and on opposite sides of the head opening.

3. The apparatus according to claim 1, wherein the capstan/roller cleaner includes a pivot member having two arms, each supporting a respective cleaning element, and wherein the pivot member is mounted on a pivot shaft extending along the third axis for limited angular movement.

4. The apparatus according to claim 1, wherein the head cleaner includes a pair of cleaning members, each cleaning member and cleaning element being constituted of a resilient material.

5. The apparatus according to claim 1, wherein the drive means includes a slide member and means for guiding the slide member for said reciprocating movement along said second axis.

6. The apparatus according to claim 5, wherein the slide member has side flanges, and wherein the guiding means includes opposed pairs of guide members, each pair forming a passage extending along said second axis and along which the side flanges are slidably guided.

7. The apparatus according to claim 6, wherein the slide member has an elongated slot; wherein the drive means includes a driven gear in meshing engagement with said at least one spindle, and a rotating member in meshing engagement with, and rotatable about a fourth axis by, the driven gear; and wherein the rotating member has an eccentrically mounted pin mounted in, and movable along, the elongated slot.

8. The apparatus according to claim 7, wherein the drive means further includes a support member; a float member mounted within the support member and on which the head cleaner is mounted; and resilient means bearing against the support member and the float member, for urging the float member toward the head.

9. The apparatus according to claim 8, wherein the support member is mounted on a shaft that extends along said first axis; and wherein the drive means further includes a shaft gear mounted on the shaft and in meshing engagement with the rotating member.

* * * * *